3,185,625
INJECTIONABLE SUBSTANCES
Ethan Allan Brown, 75 Bay State Road, Boston, Mass.
No Drawing. Filed Nov. 8, 1961, Ser. No. 150,899
16 Claims. (Cl. 167—82)

This invention relates to a method of preparing drugs for injection with a hypodermic syringe. More particularly, an active drug is deposited upon micro-particles of an absorptive substance; the micro-particles encapsulated in a suitable material, and thereafter suspended in an oil or emulsified for injection. The novel injectionable substances of the instant invention are especially suitable for the administrating of drugs which may cause severe, adverse reactions on a patient.

In the prior art, it is known to inject an active drug suspended in an oil medium or emulsified in water or other suitable carrier with the active drug constituting the dispersed phase. Upon injection such substances are more slowly diffused into the patient's system, lessening the severe, adverse reactions which may occur when the active material is injected directly. However, for certain drugs, such as extracts of pollen administered to hay fever sufferers, injections of emulsified extracts still cause severe and occasionally fatal reactions. Accordingly, it is an object of the instant invention to provide injectionable substances which will slowly diffuse the active ingredient into a patient's system.

It is another object of this invention to provide an injectionable substance comprising micro-particles of starch and the like, as carriers for an active drug which are coated with a thin protective covering and thereafter suspended or emulsified in a substantially inactive carrier.

It is another object of the instant invention to provide an improved method of preparing an active drug for administration by injection.

These and other objects of the instant invention will become more fully apparent from the following detailed description with particular emphasis being placed on the illustrative example.

Briefly, according to the instant invention, an active drug is deposited on a suitable substance, such as micro-granules of starch or a similar material which will completely absorb or adsorb the drug. Thereafter, the micro-particles are encapsulated in a suitable material, such as methyl cellulose, and suspended or emulsified in an inactive carrier such as mineral oil or a saline solution. It is apparent that the encapsulated particles must be small enough in diameter to pass through a hypodermic needle. Therefore, according to the instant invention, from within outwards, there is active drug adsorbed or absorbed on the starch granules, the encapsulating substance and carrier. The suspension or emulsion of encapsulated micro-particles upon injection into a patient slowly diffuses into the tissue cells, lessening the shock of the drug upon a patient's system. Employing the instant injectionable substance, drugs which have undesirable side effects upon a patient or large quantities of the drug can be administered with immediate safety. The slow diffusion of the drug leads to longer-lasting protective effects. For purposes of this specification "adsorb" and "absorb" are used interchangeably, since both phenomena probably occur to a greater or lesser extent, depending on the particular granules and active drug employed.

The drugs which can be administered according to the instant invention include any active material which exists, or is capable of being placed in liquid form for deposition on the micro-particles of the granular carrier. Although the invention can be employed with any drug, the complete benefit from the invention is derived when employing drugs which may have side effects on the patient if administered directly. The invention, therefore, is particularly applicable for administering antigens, anti-allergic agents, toxins, and the like, including extracts of pollen for hay fever sufferers which may cause severe or even fatal reaction. It is apparent that drugs which do not affect a patient in a particularly adverse manner can be treated and administered by the method of the instant invention, particularly where it is desirable to administer a relatively non-toxic drug in relatively large doses by a single injection. By means of the instant invention, the drug is diffused slowly, providing protection for relatively long periods of time.

The immediate carriers for the active drug are preferably granules of starch of any origin and more specifically starches prepared from a parent substance such as corn or potatoes. These materials can conveniently be prepared aseptically with the granules being of a constant size, that is, within a satisfactory diameter range to permit passage through a hypodermic needle. The active extract is added to the dry starch for adsorption. This may be at room temperature and atmospheric pressure, or it may be desirable to carry out the adsorption under slight pressure or even a partial vacuum. The granules completely absorb or adsorb the drug or extract. The proportion of active substances adsorbed on the starch particles will vary over a considerable range and will usually be determined by the adsorptive capacity of the micro-particles for the particular agent adsorbed. Thus, the amount of micro-particles administered for any injection will, in large measure, depend upon the amount of agent adsorbed thereon. In addition to starch, any substance which can be aseptically prepared, is capable of adsorbing or absorbing the drug or extract, and which can be assimilated by the patient's system without harmful results can be used. Thus, other suitable substances include milled particles of dry amino acids, or nucleic acid itself, as well as many other substances capable of adsorbing the extract or vaccine.

Other than it being necessary that the particles, which act as carriers for the active drug are sufficiently small in diameter to permit their passage through a hypodermic needle, the size of the particles is not particularly critical. However, it has been found that the smaller the particle, the more stable the emulsion or suspension formed as well as the more safely the drug can be administered. Therefore, particles having diameters ranging from about 1.5 to about 35 millimicrons are preferred.

The substances employed to encapsulate the micro-particles carrying the active drug include common encapsulating materials such as the celluloses, especially methyl cellulose, and synthetic polymers. It is only necessary that the material employed to coat the particles is capable of assimilation by the patient's system without causing harmful effects. It has been found that the low molecular weight polymers of polyethylene, polypropylene, methyl methacrylate, methacrylate, etc. can be used. However, the celluloses including methyl cellulose, hydroxyethyl cellulose, ethyl cellulose and the like are particularly desirable since they are capable of being deposited as extremely thin, continuous films.

The method of coating the substance again is not particularly critical, and methods commonly known in the art can be employed. One preferred method is to suspend the discrete particles in column of air and spray a liquid encapsulating substance onto the particles. The particles, being suspended in air and in constant motion, will not unduly agglomerate and will be evenly coated with the encapsulating substance. Another method is to spray the discrete particles with a suitable adhesive material and thereafter coat the micro-particles with a finely divided dry powder by means of a moving fluid bed. Suitable methods and apparatus for use in the instant invention are disclosed in U.S. Patent Nos. 2,986,475, 2,768,095 and 2,799,241.

The carrier for the encapsulated particles include mineral oil, saline solutions and the like. The encapsulated particles can be injected directly as a suspension in oil or a physiological saline solution and oil. Alternatively, and preferably, the particles suspended in oil are emulsified with water and injected. Under the usual circumstances, water will constitute the continuous phase with the oil and particles forming the dispersed phase. Where it is desired to inject a relatively large amount of the active material, it can be desirable, by use of suitable emulsifying agents, such as Tween 20, a polyoxyethylene sorbitan mono-laurate or Span 20, a sorbitan mono-laurate to form an emulsion with water constituting the dispersed phase and the oil or physiological solution containing the suspended particles in the continuous phase. Alternatively, the carrier for the encapsulated particles suspended in oil or not suspended in oil can be a secondarily active substance or an anti-serum. Thus, the active ingredient would be adsorbed or absorbed on the starch particles for slow diffusion and the carrier assimilated by the patient's system. More specifically, an extract of pollen can be absorbed upon starch particles, the starch particles encapsuled in methyl cellulose and the micro-particles suspended in an antihistaminic agent. This suspension can be injected directly or after being emulsified with water to form a water-outer emulsion. Upon injection, the antihistaminic agent will be assimilated by the patient's system directly and the active material adsorbed on the starch will only slowly diffuse.

Having described the invention in general terms, the following embodiment is set forth to more particularly demonstrate the inventive concept. However, the invention is not to be construed as being limited thereby.

10 mg. of corn starch granules having a particle size range of from 10–20 millimicrons were placed in a container with 5 ml. of pollen extract. The pollen extract is completely adsorbed by the starch. Thereafter, the particles are suspended in a column of air in a suitable coating chamber and maintained in constant motion. While in motion, the particles are sprayed with a liquid solution of methyl cellulose. After being coated, the air pressure is turned off and the encapsulated particles removed from the coating chamber.

The coated particles were suspended in 25 ml. of mineral oil and emulsified with 40 ml. of water employing one gram of Tween 20 emulsifying agent. The emulsification was carried out by rapid agitation. The resultant emulsion is ready for injection.

The instant method of preparing injections can be employed with any toxoid, antigens, anti-allergic agents, hormones, natural and synthetic, and therapeutics. The illustrative embodiment is set forth for illustrative purposes and is not intended to limit the invention. It is possible to produce still other embodiments without departing from the inventive concept herein disclosed.

What is claimed is:

1. A composition of matter comprising an oil suspension of finely divided micro-particles having an active drug adsorbed thereon and encapsulated in a film forming substance, said film forming substance and micro-particles being capable of being assimilated by a living being without harmful effects.

2. The composition of claim 1 wherein the micro-particles are starch.

3. The composition of claim 2 wherein the micro-particles have a mean particle size of from about 1.5 to about 35 millimicrons.

4. The composition of claim 1 wherein the oil suspension of micro-particles is emulsified in an aqueous medium.

5. A composition of matter comprising an oil suspension of micro-particles of starch having a mean particle size within the range of from about 1.5 to about 35 millimicrons having an extract of pollen adsorbed thereon and encapsulated in a suitable film forming substance.

6. The composition of claim 5 wherein the suspension is emulsified in an aqueous medium.

7. The composition of claim 5 wherein the encapsulating substance is methyl cellulose.

8. The composition of claim 5 wherein the oil suspension is emulsified with an aqueous solution of an antihistaminic agent.

9. An aseptically, stable, physiological suspension for injection comprising micro-particles having a therapeutic adsorbed thereon, said micro-particle being encapsulated in a film forming substance and suspended in an oily media, the micro-particles, the film forming substance and oily media being capable of being assimilated by a living being without harmful effects.

10. The aseptically, stable suspension of claim 9 wherein the micro-particles are starch and the agent adsorbed thereon is an extract of pollen.

11. An aseptically stable physiological suspension for injection comprising micro-particles of a metabolizable substance having an agent selected from the group consisting of toxoids, antigens, anti-allergic agents, natural and synthetic hormones adsorbed thereon, said micro-particles being encapsulated in a film forming substance capable of being assimilated by a living being without harmful effects, said encapsulated micro-particles being suspended in an oil.

12. The aseptically stable suspension of claim 9 wherein the therapeutic is an anti-allergic agent.

13. The aseptically stable suspension of claim 9 wherein the therapeutic is an antigen.

14. An aseptically stable physiological suspension for injection comprising micro-particles having a therapeutic absorbed thereon, said micro-particles being encapsulated in a film-forming substance and emulsified in an aqueous medium, the micro-particles and the film-forming substance being capable of being assimilated by a living being without harmful effects.

15. The aseptically stable suspension of claim 14 wherein the therapeutic is an anti-allergic agent.

16. The aseptically stable suspension of claim 14 wherein the therapeutic is an antigen.

References Cited by the Examiner

UNITED STATES PATENTS

| | | | |
|---|---|---|---|
| 1,791,878 | 2/31 | Strauch | 167—82 |
| 2,530,480 | 11/50 | Pitkin | 167—82 |
| 2,768,112 | 10/56 | Buckwalter | 167—66 |
| 2,807,569 | 9/57 | Homan et al. | 167—82 |
| 2,921,883 | 1/60 | Reese et al. | 167—82 |
| 3,096,249 | 7/63 | Prigal | 167—82 |

OTHER REFERENCES

Beckman: H. Pharmacology, the Nature, Action and Use of Drugs, 2nd edition, Phil., W. B. Saunders, 1961, chap. 5, p. 28, 1961.

JULIAN S. LEVITT, *Primary Examiner.*

MORRIS O. WOLK, *Examiner.*